H. BRAASCH.
ADJUSTABLE COMBINED GARDEN HOE AND RAKE.
APPLICATION FILED APR. 18, 1910.
1,100,115.
Patented June 16, 1914.
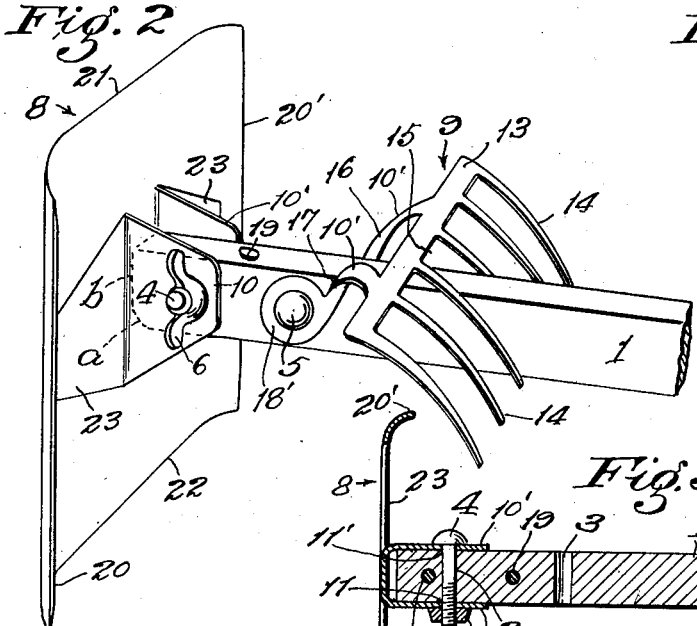
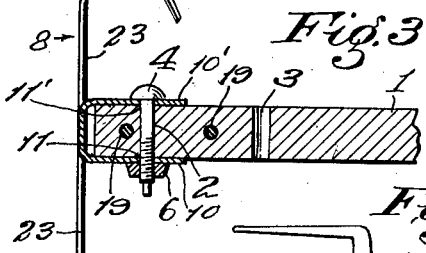
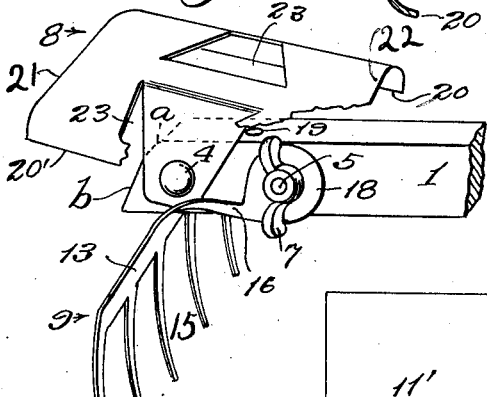
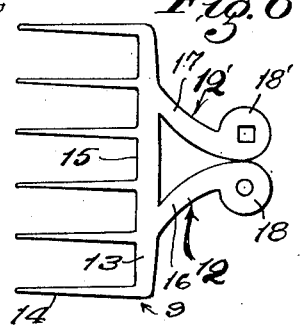
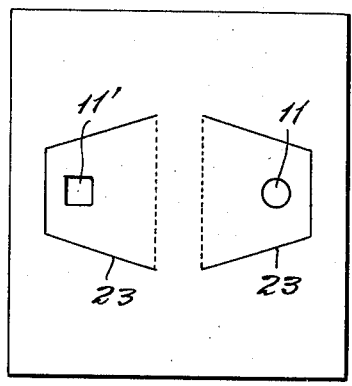
Witnesses
C. C. Holly
L. Belle Rice
Inventor
Henry Braasch
James R. Townsend
his atty.

UNITED STATES PATENT OFFICE.

HENRY BRAASCH, OF LOS ANGELES, CALIFORNIA.

ADJUSTABLE COMBINED GARDEN HOE AND RAKE.

1,100,115.  Specification of Letters Patent.  Patented June 16, 1914.

Application filed April 18, 1910. Serial No. 556,281.

*To all whom it may concern:*

Be it known that I, HENRY BRAASCH, a citizen of the United States, residing at Los Angeles, in the county of Los Angeles and State of California, have invented a new and useful Adjustable Combined Garden Hoe and Rake, of which the following is a specification.

The object of this invention is to provide a light, cheap and simple implement which is convertible from hoe to rake and vice versa, and in which the tool heads are adjustable to different angles with the handle, and are capable of being readily made from sheet metal either by the process of stamping or of cutting and bending.

Another object of the invention is to provide a hoe or rake head which is adapted for attachment to a handle made from vertical grain Oregon pine or like material having more or less flat sides.

A further object of the invention is the provision of a device of this character which may be used as a scuffle hoe and rake alternately without removing either the hoe or rake heads.

A further object is to provide a superior mixing hoe for mortar and the like.

The accompanying drawings illustrate the invention.

Figure 1 is a view of an implement constructed in accordance with this invention. The hoe head is shown in position for use and the rake head out of position for use. Dotted lines indicate different positions to which the hoe head may be adjusted for use. Fig. 2 is an enlarged perspective view of the implement, the hoe head being in position for use and the rake head out of position for use. Fig. 3 is a longitudinal mid-section on line $x^3$, Fig. 1, omitting the rake head. Fig. 4 is a broken view of the implement with the rake head in and the hoe head out of position for use. Fig. 5 is a view of the blank from which the hoe head is stamped or bent up. Fig. 6 is a view in reduced scale of the blank from which the rake head is stamped or bent up.

The handle 1 may be of any suitable form and is preferably of an oblong cross section as indicated in Fig. 4 and is provided near one end with two bolt holes 2, 3, to receive bolts 4, 5, to secure the implement heads to the handle. Said bolts may be provided with thumb nuts 6, 7. The handle is provided with two implement heads 8, 9, one of which may be a hoe or weeder head of any desired form and the other may be a rake head of any desired form.

The hoe head 8 and the rake head 9 are both made of sheet metal and each is provided with a pair of shanks stamped or bent from the plate from which the head is made and embracing the handle 1.

10, 10' designates the hoe shanks and 12, 12' the rake shanks. Said shanks are perforated to receive carriage bolts 4 and 5. The lower end of the handle 1 may be rounded at one edge as at $a$ and beveled therefrom to the other edge as at $b$, and is accommodated in the space between the shanks, so that when the hoe head 8 is turned over the rounded edge $a$ into operative position across the lower end of the handle, the hoe head will seat against the edge $b$ and will be stopped against any further turning in a direction away from the edge $a$ as clearly shown in Fig. 2. This aids considerably in maintaining the hoe head in operating position when pressure is brought to bear against its cutting edge 22.

The shanks 10, 10' of the hoe may be tapered from the hoe blade toward their tips and provided with holes 11, 11' to receive the bolt 4, one of said holes being round and the other square to fit the opposite ends of the bolt. The hoe head may be adjusted to any desired angle for use or for non-use by loosening the nut 6 and turning the said head on the bolt and then tightening the nut. The shanks 12, 12', of the rake are struck and bent up from the sheet of which the rake head is formed. Said rake head comprises a bar 13 having an even number of teeth 14 projecting therefrom; said teeth being symmetrically disposed on opposite sides of the middle inter-tooth space 15 which is designed to accommodate the handle when the rake is out of commission. The shanks 12, 12', of the rake head comprise stems 16, 17, that terminate in perforated ears 18, 18'; and the shanks are twisted so that the ears extend in parallel planes that are normal to the bar 13 and accommodate between them the handle 1. Said ears are perforated to receive the pivot bolt 5 by which the rake head is secured to the handle 1, thumb nut 7 being provided to clamp the ears tightly against the handle 1 to hold the head in position.

The perforations 2 and 3 in the handle are spaced apart and the shanks of the rake are above the shanks of the hoe, so that when the heads are pivoted as indicated in the drawings they may be alternately brought into and out of operative position by loosening the thumb nuts and swinging down to the end of the handle that head which is to be brought into commission and swinging away from the end of the handle that head which is to be brought out of commission. When the rake head is used, the tool will be turned over from the position in Fig. 1 to the position shown in Fig. 4.

The rake teeth are curved in the direction toward which the shanks of the rake extend and when the rake head is in operative position the bar of the rake contacts with the under side of the rake handle close to the pivotal point of the hoe head. When the rake head is thrown out of commission the middle intertooth space will accommodate the handle and the rake teeth will project on each side of the handle. The hoe head may then be adjusted for use at the end of the handle. Said hoe head is preferably two-edged so that in some positions of the hoe head the hoe may be used as a scuffle hoe, both edges being available for use. One or more rivets 19 may be inserted through the end of the handle and between the bolt holes 2 and 3 to keep the handle from splitting.

It is feasible with this construction of implement heads to make excellent handles from stock lumber such as Oregon pine boards and the like, which may be ripped to appropriate dimensions and smoothed in the usual process of manufacture.

The hoe head is preferably formed from a rectangular blank and the shanks are symmetrically disposed on opposite sides of the center line of the head, so that when said head is secured on the handle it presents four edges two of which, 20 and 20', may be curved in the direction toward the side from which the shank projects and the other two edges, 21 and 22, may be sharpened. The openings 23 from which the shanks have been stamped up peculiarly fit the implement for use as a mortar-mixing hoe, the rim of the hoe cutting through the mortar all around said openings while a portion of the mortar passes through the openings, thus effecting a more perfect mixing than with an imperforate hoe blade.

In practical use as a garden implement the heads may be shifted into and out of commission as desired or one or the other of the heads may be removed and the remaining head used as before described, or if desired, one tool may be provided with a number of different kinds of hoe heads and rake heads, not shown, which may be interchangeably used for different purposes.

I claim:—

An implement of the character set forth comprising a hoe head, fastening shanks bent up at an angle from the hoe head along the horizontal axis thereof to leave openings, a handle inserted at one end between said shanks, and means adjustably fastening the handle to said shanks, said hoe head when turned into operative position being seated against said end of the handle.

In testimony whereof, I have hereunto set my hand at Los Angeles, California, this 8th day of April, 1910.

HENRY BRAASCH.

In presence of—
JAMES R. TOWNSEND,
L. BELLE RICE.

---

Copies of this patent may be obtained for five cents each, by addressing the "Commissioner of Patents, Washington, D. C."